Nov. 19, 1929.  E. J. MADDEN  1,736,046
BRAKE CONTROLLING MECHANISM
Original Filed Dec. 29, 1924  4 Sheets-Sheet 1
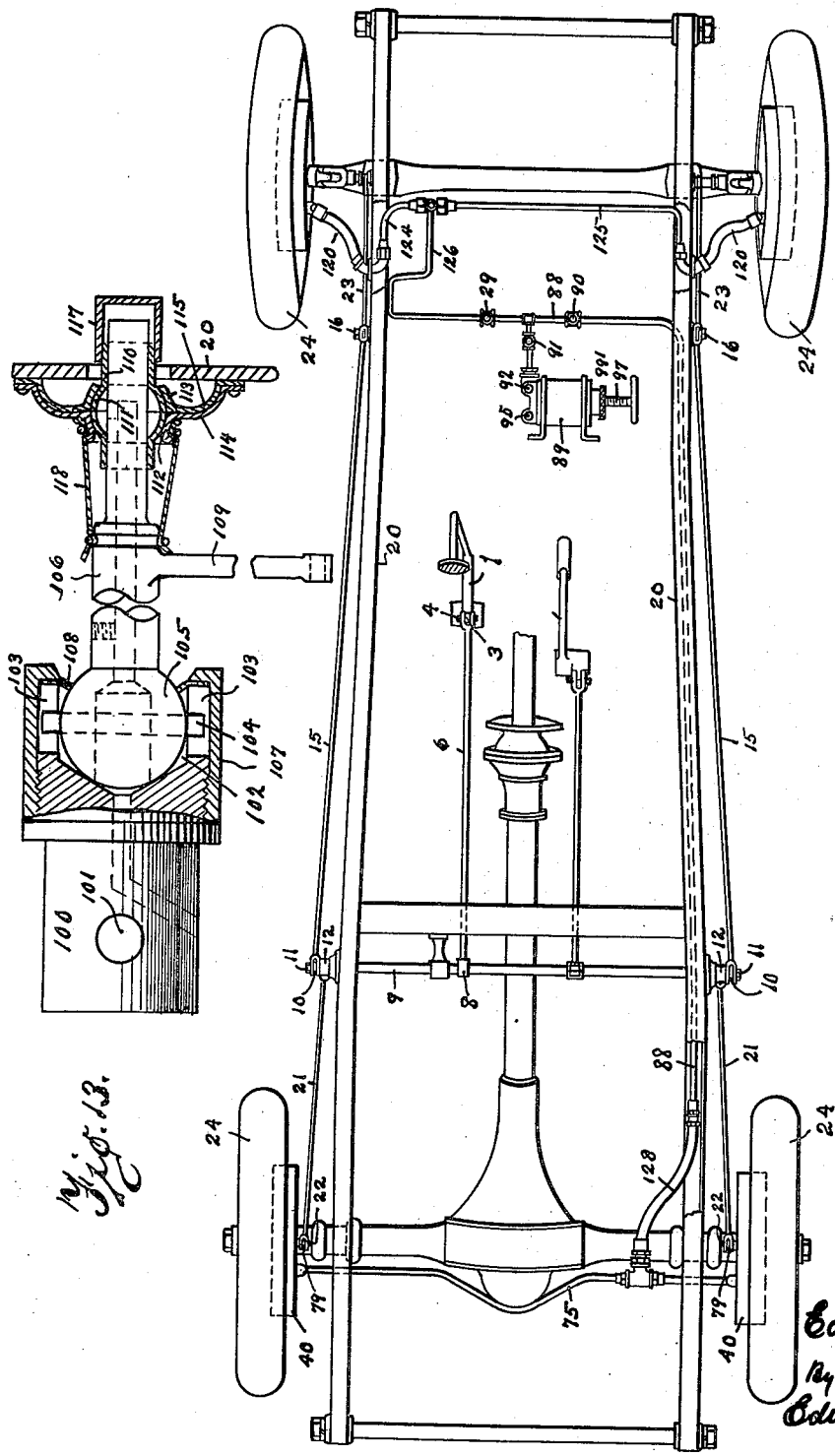
INVENTOR.
Edward J. Madden
By
Edward N. Pagelow
ATTORNEY.

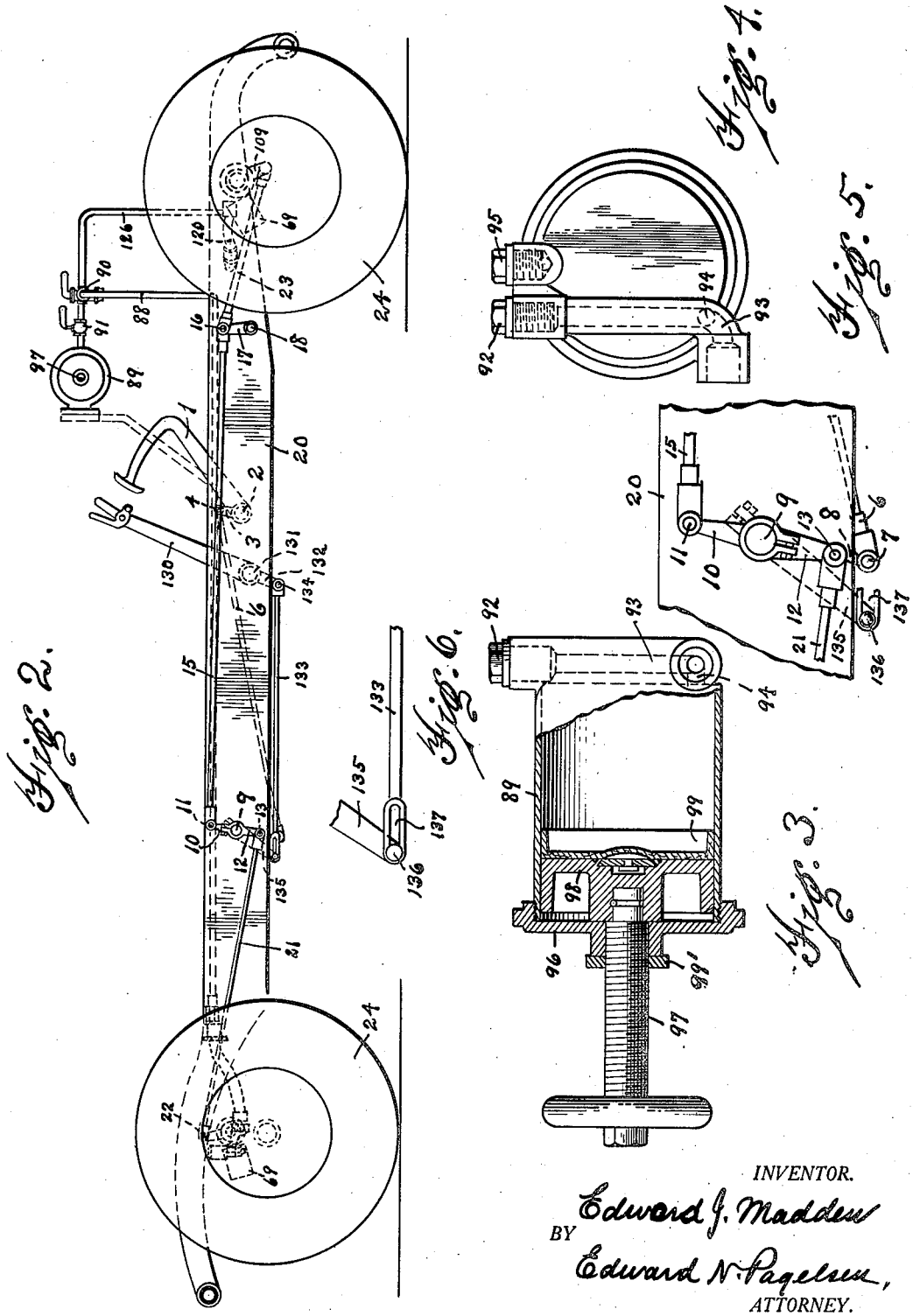

Nov. 19, 1929.  E. J. MADDEN  1,736,046
BRAKE CONTROLLING MECHANISM
Original Filed Dec. 29, 1924  4 Sheets-Sheet 3
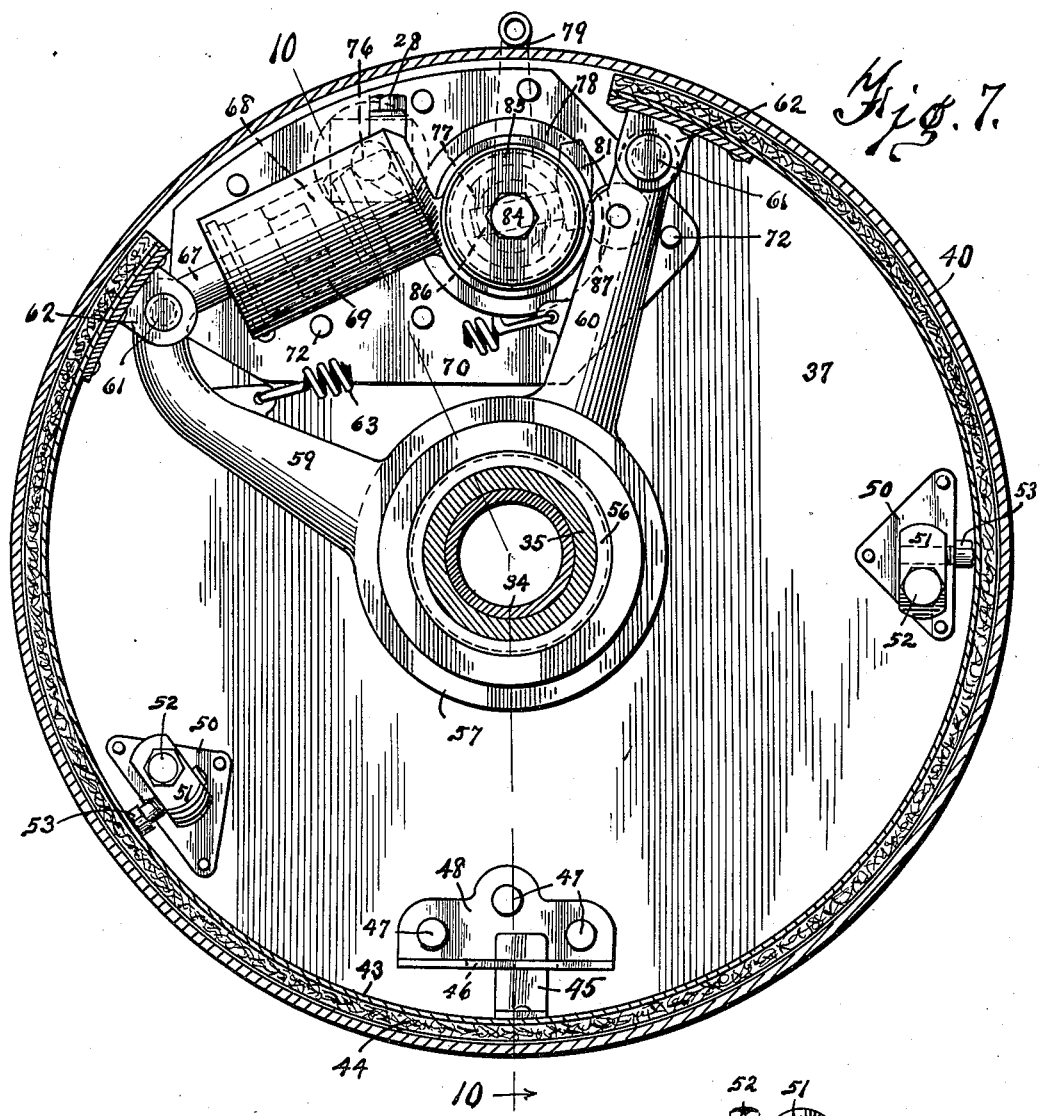
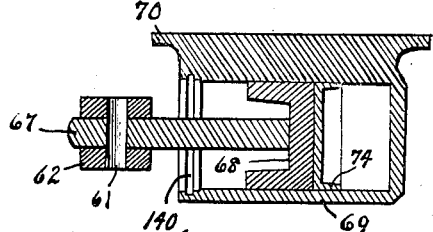
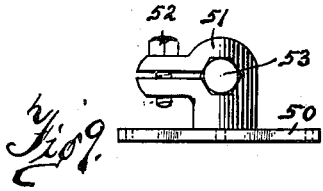
INVENTOR.
Edward J. Madden
BY Edward N. Pagelsen,
ATTORNEY.

Nov. 19, 1929.  E. J. MADDEN  1,736,046
BRAKE CONTROLLING MECHANISM
Original Filed Dec. 29, 1924  4 Sheets-Sheet 4
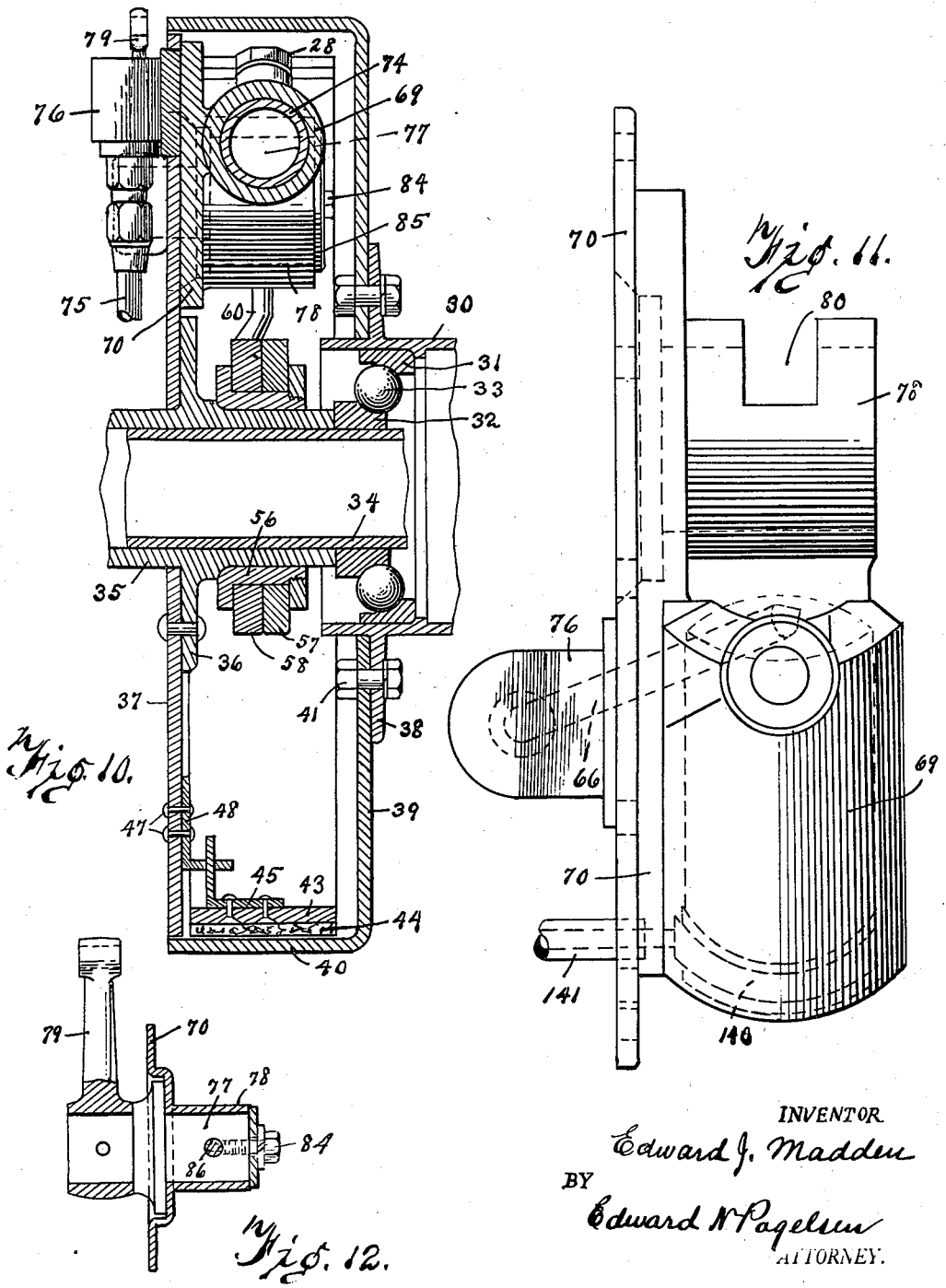
INVENTOR
Edward J. Madden
BY Edward N. Pagelsen
ATTORNEY.

Patented Nov. 19, 1929

1,736,046

UNITED STATES PATENT OFFICE

EDWARD J. MADDEN, OF DETROIT, MICHIGAN

BRAKE-CONTROLLING MECHANISM

Application filed December 29, 1924, Serial No. 758,725. Renewed December 8, 1927.

This invention relates to brakes for wheeled vehicles, preferably automotive vehicles, and its object is to provide a controlling mechanism for such devices which will equalize the restraining forces applied to the two wheels on an axle and which may be so constructed that in a vehicle equipped with brakes for wheels of more than one axle, the force applied to the brake system can be divided between the wheels in any desired proportions.

This invention consists in a brake attached to each of the two wheels on one of the axles of a vehicle, of means for applying force to the brake to produce a breaking action, a pipe extending across between the brakes of the two wheels, a movable abutment for each brake, a liquid in said pipe, and means connected to each abutment and adapted to transfer stresses to and be stressed by the liquid in said pipe.

It further consists of braking mechanism of this character for each of the wheels of a pluarlity of axles, means for simultaneously operating all the brakes, conductors connecting the pipes pertaining to the several axles, and means for supplying liquid to said conductors.

It also consists of the details of construction illustrated in the accompanying drawings and particularly pointed out in the claims.

In the drawings, Fig. 1 is a plan of the chassis of a vehicle equipped with my improved brake system. Fig. 2 is a side elevation thereof. Fig. 3 is a longitudinal section of the storage cylinder for the control liquid. Fig. 4 is an end view thereof. Figs. 5 and 6 are elevations of connections for the operating and emergency levers. Fig. 7 is a vertical section of a brake drum. Fig. 8 is a longitudinal section of a control cylinder and its piston. Fig. 9 is an elevation of a safety clamp. Fig. 10 is a section on the line 10—10 of Fig. 7. Fig. 11 is a plan of the central piston and its mounting on a larger scale. Fig. 12 is a detail of a brake-operating arm. Fig. 13 is a detail of the brake-operating mechanism for a front wheel.

Similar reference characters refer to like parts throughout the several views.

While this brake mechanism is primarily intended to be adapted for use on all the four or more wheels of a motor vehicle, it is not limited thereto as it can be used in connection with the two wheels of any single anxle, and, after being applied in pairs to the wheels of all the axles of a vehicle, these pairs of brakes may be disconnected from each other so that the brakes of each axle may work independently of those on the other. Any desired means may be employed to operate these brakes and while I have shown a brake pedal 1 mounted on a shaft 2, and a small crank arm 3 formed on this pedal, which arm carries a pin 4 extending through the eye in the forward end of the link 6, which link connects to a pin 7 carried by the arm 8 on the shaft 9; any other desired means may be employed to turn this shaft.

Mounted on the ends of the shaft 9 are upwardly extending crank arms 10 which carry the pins 11, and downwardly extending crank arms 12 which carry the pins 13. Links 15 extend from the pins 11 to the pins 16 carried by the small crank arms 17 which are pivoted on pins 18 mounted on the side bars 20 of the vehicle. The links 21 extend from the pins 12 to the pins 22 of the braking mechanism of the rear axles. The links 23 extend from the pins 16 to the braking mechanisms of the front wheels 24. As the braking mechanisms of the four wheels are alike, the description of one will suffice for all.

Referring to Figs. 7 and 10, a wheel hub 30 carries a bearing ring 31, which, in connection with the other bearing ring 32 and the balls 33 constitute a bearing which supports the wheel on the tube 34 which constitutes a portion of the rear axle housing. Rigid with this sleeve 34 is a sleeve 35 which is another portion of the housing and which carries a flange 36 to which the disk 37 is attached. A flange 38 extends outward from the hub 30 and to this flange the disk 39 of the brake drum 40 may be secured by means of bolts 41. The construction thus far explained is not new and any desired modification thereof may be made.

Within the brake drum 40 is a metal brake band 43 having a facing 44 of any desired material and an angle bracket 45 secured to the band 43 projects inwardly through an eye 46 in a second bracket 48 secured to the disk 37 by means of rivets 47. This structure prevents the central portion of the band from moving longitudinally of the axle but the eye 46 which is indicated in dotted lines in Fig. 7 permits sufficient circumferential movement of the brake band relative to the axle.

Secured to the disk 37 at various points are small plates 50 which carry the split bosses 51. In the bosses are mounted the set screws 53 whose heads limit the inward radial movements of the brake band 43. The screws 53 are prevented from turning by means of the set screws 52, as shown in Fig. 11.

A bushing 56 is mounted on the sleeve 35 and supports the hubs 57 and 58 of the two arms 59 and 60. These arms carry the pins 61 which extend through holes in the lugs 62 attached to the ends of the brake band 43. The arms 59 and 60 are rotatable on the sleeve 35 and the brake band therefore is capable of limited circular movement but its ends are prevented from moving radially outward and engaging the brake drum 40. A spring 63 draws the arms 59 and 60 and the ends of the band 43 toward each other, the brake band being contracted thereby.

The end of the arm 59 beyond the pin 61 carried thereby is formed into a piston rod 67 which contacts with a piston 68 slidable in a cylinder 69 attached to a plate 70, and this plate is attached to the disk 37 in any desired manner, rivets 72 being shown. The end of the piston rod 67 can slide on the piston 68 and therefore there is no binding. A packing cup 74 of leather or rubber is shown in contact with the piston 68 to prevent leakage. The cylinders of the brakes of the two wheels are connected as indicated in Fig. 1 by a pipe 75 which extends across from one cylinder to the other on the same axle being connected to the cylinders at 76 as shown in Fig. 7. The cylinders are provided with passages 66 for the liquid, as indicated in Fig. 11, extending from the inner end of the cylinders to the points of connection of the pipe 75. This pipe 75 and the ends of the cylinder are filled with a mobile liquid and any force exerted by the arm 59 of one brake is transmitted to the liquid by means of the piston 68 connected to said brake and this force impressed upon the liquid is transmitted to the piston 68 of the brake mechanism of the wheel on the opposite end of the axle. As the braking effect of each brake band 43 is in proportion to the force exerted by this band on the pin 61 carried by the arm 59 and therefore on the liquid, this liquid will balance the braking effect of the two brake bands in the two wheels on that axle, providing that some device is present to exert circumferential force on the opposite ends of these brake bands.

The means for exerting the circumferential force on the opposite ends of the brake bands through the pins 61 carried by the arm 60 consists of a pin 77 which is rotatably mounted in a sleeve 78 mounted on the plate 70. An arm 79 connects to the inner end of this pin and a slot 80 is formed in the sleeve 78 so as to permit the cam 81 to extend through beyond the sleeve 78. I prefer to secure this cam in position by means of a screw 84 which is threaded in the pin 77 which screw engages a stem 86 on this cam and also holds the washer 85 in position. When this arm 79 is swung to the right in Fig. 7 the cam 81 engages the roller 87 carried by the arm 60 and forces the upper end of this arm to the right which tends to expand the brake band between its ends and also to give it circumferential movement. As this circumferential movement is resisted by the piston rod 67 the middle portion of the brake band necessarily expands to engage the brake drum.

In order to supply the cylinders and pipe 75 with a proper liquid, a supply pipe 88 may be connected to the pipe 75 and extend to a container 89, valves 90 and 91 being provided to prevent back pressure on the container. This container is preferably provided with a filling opening closed by a plug 92, as shown in Fig. 4, and the pipe 88 may connect to the passage 93 having an opening 94 extending into the container and having its upper end closed by the plug 92. A second plug 95 normally closes a vent opening and can be removed when the container is being filled. A head 96 carries a screw 97 which connects to a piston 98 having a packing washer 99, and when this screw is properly turned, the piston forces the liquid through the pipes and fills the cylinders 69. A lock nut 99' prevents undesired movement of the piston.

When steering wheels are provided with brakes of this character, means must be provided to permit such wheels to swing relative to the frame on which the brake applying mechanisms, in this case, the links 23, are mounted. Referring to Fig. 13, the pin 100 corresponds to the pin 77 which is swung by the arm 79 previously described, and this pin has a hole 101 to receive the stem 86 of the cam 81 which swings the arm 60. This pin 100 is formed with a socket 102 whose walls have slots 103 to receive the ends of the pin 104 carried by the ball 105 on the end of the shaft 106. A sleeve 107 screws onto the pin and holds a two-part washer 108 against the ball to complete a universal coupling between the shaft 106 and the pin 100. An arm 109 is attached to this shaft and connects to the forward end of the link 23 by means of the usual pivot pin (not shown).

The shaft 106 is supported by the side frame 20 for free swinging movement in all directions, but as the center of the ball 105 is in the central line of the king-pin of the steering knuckle of the wheel on which this brake is mounted, only a limited vertical movement is ordinarily required. I provide for this by means of a sleeve 110 slidable and rotatable on the shaft 106 and this sleeve is formed with a ball 111 which is mounted in the spherical sockets 112 and 113 formed respectively on the two cup shaped stampings 114 and 115 which are attached to the side frame 20. The shaft 106 may therefore swing in all directions and move endwise relative to the side frame 20. A dust cap 117 may be used to close the inner end of the sleeve 110 while a flexible boot 118 may protect the other end.

Because of this movement of the front wheels relative to the frame of the vehicle, flexible hose 120 are preferred to conduct the controlling liquid to these front brakes, these lengths of hose being attached to the parts 76 as shown in Figs. 10 and 11. The opposite ends of these two lengths of hose are attached to the pipes 124 and 125 which unite the pipe 126 extending to the pipe 88, as shown in Fig. 1.

When the system is to be filled, the container 89 is filled with the liquid, preferably castor oil, the valves 90, 91 and 29 are opened, the vent plugs 28 of the cylinders 69 are removed and the screw 97 turned in until the entire system is filled. The valve 91 is then closed. The liquid of either axle may be replenished independent of the other by closing the valve 29 or the valve 90, the other valve and the valve 91 remaining open. If it is desired to operate the brakes of either axle independently of the other, then the valve 29 or valve 90 may be closed.

As the rear axle moves up and down relative to the frame, I prefer to insert a length 128 of flexible tubing in the pipe 88.

When the same amount of braking force is to be exerted on each wheel, then the diameters of the brake drums, and of the cylinders 69 will be the same and the lengths of the levers 10 and 12 be equal. If, however, less braking action is desired for the wheels of one of the axles then the diameters of the clyinders 69 of the brake mechanisms of those wheels may be reduced, such reduction being easily calculated by automotive engineers to meet the desired ratio of reduction of braking action.

The braking mechanism thus far described is intended to be operated by a foot pedal. Should anyone desire to lock brakes of this character or operate them by an independent lever, such a lever 130 may be mounted on a shaft 131 and have an arm 132 connecting to a link 133 by means of a pin 134. An arm 135 attached to and extending down from the shaft 9 carries a pin 136 extending through a slot 137 in the rear end of this link. This slot permits the shaft 9 to be turned by the foot pedal 1. When the lever 130 is swung back, the same braking action takes place as when the pedal 1 is operated. This lever 130 may be provided with the ratchet mechanism usually found in connection with emergency brakes of motor vehicles and as such mechanism is well known, none is shown.

In order to prevent the oil which may pass the packing ring 74 from getting onto the brake bands, I prefer to form the cylinders 69 with grooves 140 and connect drain pipes 141 thereto at their lowest points, which pipes extend through the disks 37.

The details of construction and the proportions of the parts of this brake control system may all be changed by those skilled in the art without departing from the spirit of my invention as set forth in the following claims.

I claim:—

1. In a brake controlling mechanism, a brake band and a drum therefor provided with a central cylindrical member, arms rotatably mounted on said cylindrical member and connected to the ends of the band to prevent radial movement of said ends, and means to move said ends circumferentially of the drum relative to each other to cause the intermediate portions of the band to engage and disengage the drum, and means to limit the circumferential movement of said band and arms.

2. In a brake controlling mechanism, a brake band and a drum therefor, provided with a central trunnion, a pair of arms rotatable on the trunnion and having their ends connected to the ends of the bands to prevent radial movement thereof, and means to swing one of the arms to cause the ends of the band to move circumferentially relative to each other to cause the intermediate portions of the band to engage and disengage the drum and means to maintain said arms and band against rotation with the drum.

3. In an internal expanding brake for a rotatable drum, a brake band adapted to be expanded against said drum by separating the ends thereof, supporting means for said band adapted to permit said separation while preventing radial movement of the said ends, and actuating means for said brake band adapted to move said ends circumferentially.

EDWARD J. MADDEN.